Dec. 12, 1950     H. H. MOORE ET AL     2,533,279
PRESSURE INDICATING ARBOR PRESS
Filed Sept. 24, 1946     2 Sheets-Sheet 1
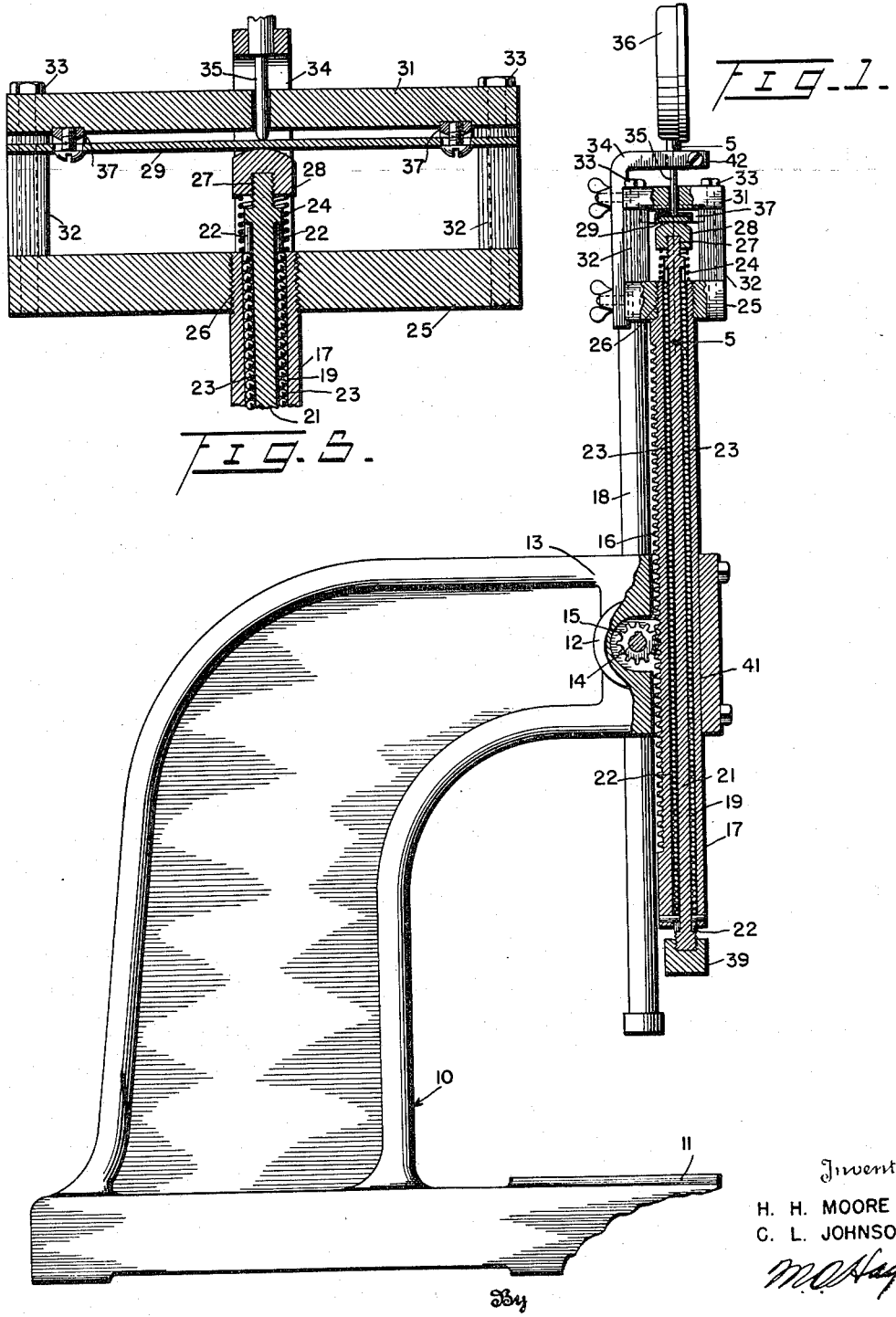
Inventors
H. H. MOORE
C. L. JOHNSON

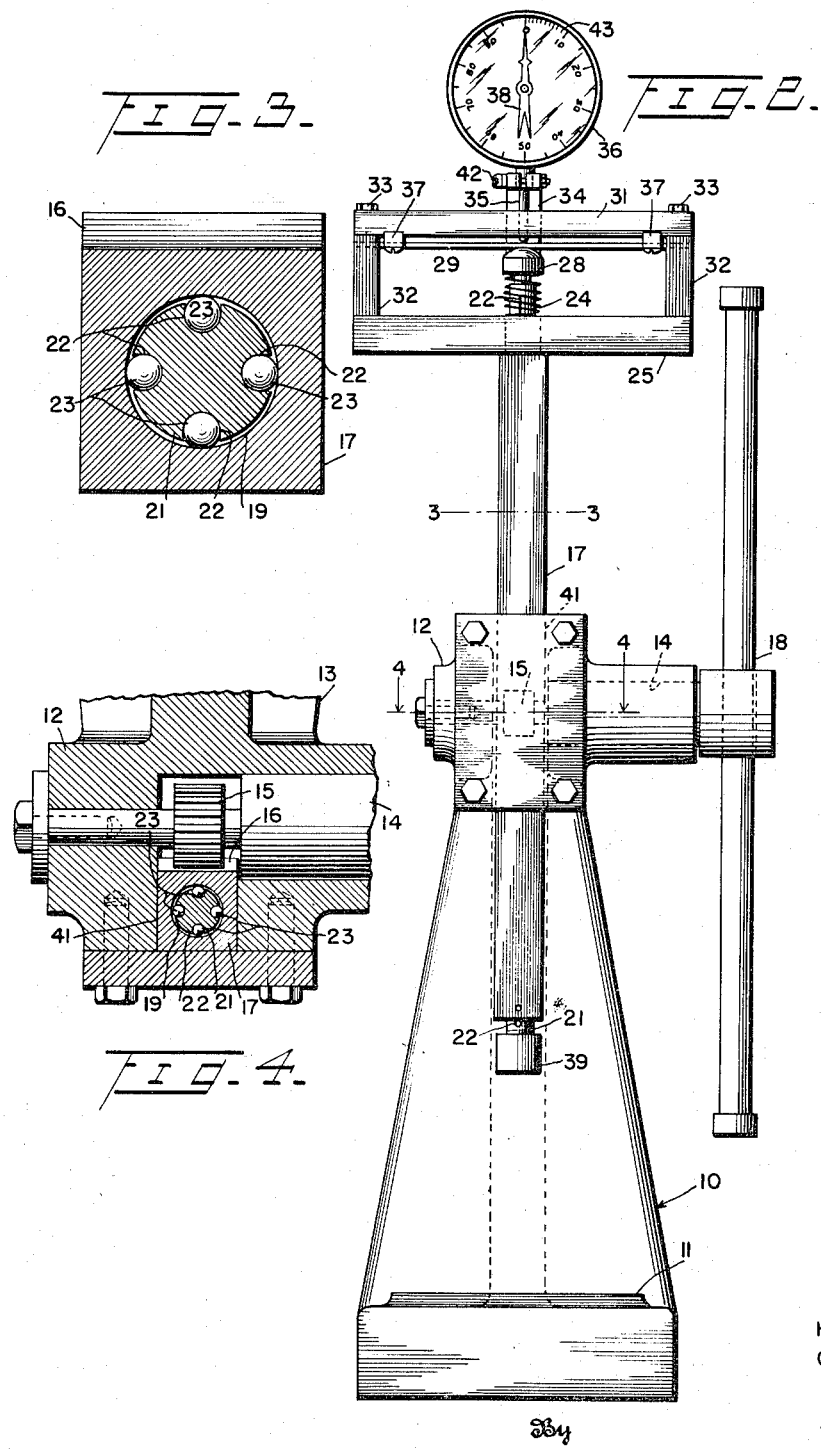

Patented Dec. 12, 1950

2,533,279

UNITED STATES PATENT OFFICE 2,533,279

PRESSURE INDICATING ARBOR PRESS

Harry H. Moore, Washington, D. C., and Carroll L. Johnson, Hyattsville, Md.

Application September 24, 1946, Serial No. 699,066

8 Claims. (Cl. 73—141)

(Granted under the act of March 3, 1883, as amended April 30, 1928; 370 O. G. 757)

This invention relates to improvements in a press whereby the force exerted by the ram at any instant is visually indicated and, more specifically, to means for indicating the degree of force applied by an arbor press.

In various well known forms of arbor press a ram is moved by means of a rotating cam, rack and pinion, lever and fulcrum, or other suitable well known means, toward a base on which is situated the work or the object to be compressed. For example, one well known type of arbor press has a rotatable spindle transversely mounted on the arbor press and operable by a suitable lever attached to the spindle for manually applying force to turn the spindle. On the other end of the spindle is arranged a pinion in engagement with a rack cut in the face of the ram in such a manner that rotation of the spindle causes movement of the ram toward the base of the press. Such presses have no means for indicating the pressure applied, or for accurately controlling the pressure applied by the press at any moment.

One object of the present invention is to provide new and improved means for indicating accurately at all times the pressure being exerted by a press upon the work.

Another object is to provide a stress member for applying pressure to the ram of a press and indicating the pressure applied to the work under control of the degree of deflection of the stress member.

Another object of the invention is to provide pressure controlling and indicating apparatus for an arbor press whereby pressure of predetermined degree may be applied and indicated during each successive use thereof.

A still further object of the invention is to provide force measuring means secured to an arbor press whereby relative motion between the plunger and the ram, against spring pressure, is employed to actuate a mechanical deflection gage.

Still other objects, advantages and improvements will become apparent from the following description, taken in connection with the accompanying drawings, of which:

Fig. 1 is a side elevation view, partly in section, showing the improved arbor press having means for indicating force applied thereby;

Fig. 2 is a front elevational view of the improved arbor press showing details of the force measuring and indicating apparatus;

Fig. 3 is an enlarged cross-sectional view taken along the line 3—3 of Fig. 2 and showing a plunger slideably supported within the ram of the press;

Fig. 4 is a sectional view somewhat enlarged and taken along the line 4—4 of Fig. 2; and Fig. 5 is a sectional view somewhat enlarged and taken along the line 5—5 of Fig. 1.

In Fig. 1 the supporting arbor is indicated generally by the numeral 10, 11 indicates the pressure plate at the base of the press for supporting the material on which work is to be performed, and 12 indicates a transverse bearing within the arbor head 13 in which is mounted a driving spindle 14. A pinion 15 is keyed to the spindle 14 in any suitable fashion and engages the teeth of the rack 16 which are transversely milled in the ram 17 whereby the ram is moved upwardly or downwardly by rotation of the spindle 14, which, in turn, is rotated by means of the lever 18 secured thereto. However, if desired, the spindle 14 may be power-operated, in which case, a suitable belt-driven pulley or other safety device for preventing damage to the press may be advantageously employed in place of the hand-operated lever 18.

The ram 17 is provided with a longitudinal channel or recess 19 formed or cut therein throughout its length for the purpose of admitting a plunger 21 which is closely fitted therein so that the plunger is longitudinally slideable within the ram.

The recess 19 may be bored or milled through the ram in any convenient manner so as to have a diameter slightly in excess of the diameter of the plunger in order that the plunger will fit and slide smoothly therein and be supported throughout its length by the heavier and more substantial mass of the ram 17. For example, the ram 17 may be formed by milling teeth 16 on one side thereof and the recess 19 by a drilling operation. The ram 17 suitable for the improved press may be formed from flat or other special stock by a bending or rolling operation leaving a channel such as 19 therein in which the plunger may be fitted in the same general manner as in the case of recess 19 in the solid ram illustrated.

In order that the plunger 21 may be firmly supported by the ram 17 throughout its length and may furthermore be supported to minimize the friction therebetween, suitable slots 22 are formed in the sides of the plunger, as for example in the manner shown in Fig. 3, and ball bearings 23 of appropriate size may be placed in such slots throughout the length of the ram. Such slots are conveniently formed by boring holes longitudinally through the plunger stock and then turning the stock on a lathe or grinding machine until the longitudinal holes are opened at the outer portions thereof and the plunger is reduced to the exact size desired. When the bearings are formed of balls having a diameter slightly greater than the depth of the slots 22, or when the hereinbefore described holes in the plunger are filled with ball bearings, the plunger is prevented from making sliding contact with the ram, and friction therebetween is at a minimum. Nevertheless, the plunger is prevented from bending or flexing within the ram when three or more such slots are disposed equally about the periphery of the plunger in supporting relation thereto within the ram. Means comprising a suitable washer, clip or plurality of pins is secured to the ram and extends across the bottom ends of the slots 22 sufficiently to prevent the bearings 23 from falling from the slots.

The spring 24 is disposed between the end of the ram 17 and the cap 28 and serves a double function. When no force is being exerted by the press upon the work the spring maintains a plunger in a normal rest position such that cap 28 rests against the lower side of spring 29 and when force is being exerted the spring 24 extends slightly, but remains in position such that the coils thereof retain the ball bearings within the slots. By means of this action the balls are retained within the slots and are returned to their normal position within the ram whenever the plunger is returned to its normal position. It is therefore convenient to mill the slots 22 rather than drilling holes in plunger and thereafter grinding the plunger as hereinbefore described.

With the arrangement as above described the plunger may move upwardly with respect to the ram as pressure is applied at the work end thereof and the ball bearings will roll freely against the sides of the channel or recess in the plunger, and rolling friction only will be encountered. At the same time the plunger is supported throughout its length by the stiffness of the ram so that lateral movement between the plunger and the ram is prevented, and substantially the full stiffness of the ram is thus imparted to the plunger. In Fig. 3 the preferred form is shown employing four slots, each of which is filled with bearings throughout the length thereof.

The ram may be square in cross section, as shown in Fig. 3, round, or any other suitable shape provided that the teeth of the rack thereof may be engaged by the pinion 15. This ram is arranged within the arbor head 13 in a channel 41 of shape similar to that of the ram, the channel 41 being cut or formed during fabrication within the arbor head 13.

In accordance with this invention the upper end of the ram has attached thereto, as in Figs. 1 and 2, apparatus for measuring and indicating the pressure applied by the press, the apparatus being supported thereon by the transverse support 25 secured to the ram as by threads 26. A cap member 28 is secured to the upper end of the plunger as by the threads 27. This cap member has a rounded and hardened upper surface suitable for transmitting pressure to a leaf spring strain member 29 which is provided for measurement of the force applied. The spring 29 is supported and retained in any suitable manner whereby a deflection thereof caused by upward thrust of the cap member 28 may be utilized to operate a suitable deflection indicating device or gage indicated generally at 36. The manner in which this may be accomplished is illustrated in Fig. 2 in which four spacer members 32 support the beam 31 which is held firmly in place on the spacers by means of bolts 33 which pass through the beam 31 and the spacers 32 and engage the transverse support 25.

This transverse support has a length similar to that of the beam 31, each being sufficiently long to accommodate the leaf spring 29 and to permit deflection thereof between the pair of fulcrums 37 when force is applied to the center thereof by thrust of the plunger and the cap 28. The fulcrums are secured by welds, screws or other suitable means to the beam 31 at points equidistant from the cap 28. The leaf spring 29 is slotted to receive the screws and permit flexing of the spring without restraint by the screws passing therethrough at the fulcrums.

A support 34 is secured to the beam 31 and to the transverse support 25 and extends above the center of the beam in order to serve as a rigid support for the gage 36 which is attached thereto in any suitable manner as by the clamping screw 42. The gage 36 contains suitable means of conventional design for translating the linear motion of the actuating pin 35 resulting from deflection of spring 29 into rotary motion which is communicated to a pointer 38 whereby the pointer is caused to advance over the dial 43 in proportion to the degree of motion imparted to the actuating pin 35. The pin 35 passes loosely through beam 31 and rests lightly against the spring 29. The gage is in proper adjustment when the pointer 38 normally indicates zero pressure.

From the foregoing description it will be understood that the object to which the force is to be applied may be placed upon the plate 11, or upon any upward extension used therewith, and that the head 39 may be placed in engagement with the object to be pressed. While the height of the ram is being adjusted to bring the head 39 into engagement with the work, the ram, plunger and force measuring apparatus are lowered as a unit by moving the lever 18 without change in the zero reading of the gage. When further motion is imparted to the ram by moving the lever 18, the transverse support 25, the spacers 32, the beam 31, the support 34 and gage 36 continue to be moved downwardly in accordance with the degree of the movement of the lever 18. The plunger 21 and the head 39 thereon, being slideably arranged within the ram, do not necessarily move downwardly with the ram but the head 39 is pressed against the work with a force corresponding to the stiffness of the spring 29 which is caused to deflect at the center by an amount corresponding to the force exerted on the work. Furthermore the work will be compressed by an amount corresponding to the restoring force of the spring 29 which varies in proportion to the motion imparted to the ram by the rotation of the pinion 15 and the lever 18.

The gage is so mounted and so constructed that the actuating pin 35 rests lightly against the spring at all times and has substantially no effect on the deflection of the spring 29. Thus the center of the spring moves with respect to the gage support and the actuating pin is depressed in accordance with the pressure then being applied by the press so that a force indication will be registered on the dial 43 at any instant during the pressing operation.

By means of this improvement it has been found that pressing operations are continually within the accurate control of the operator of an arbor press of the general type described, for the reason that when the pressure reaches any predetermined value, movement of the lever 18 may be stopped. An observer may, if desired, also record the exact force developed in each case, as for example, when the lever is rotated to a certain fixed position for each operation and the succeeding pressing operations are performed in a similar manner. Thus, by the recording of force or pressure actually developed in each operation when a large number of pellets, detonators, primers, or the like are being formed, an accurate indication of the internal condition of each piece so pressed may be obtained without disassembly or destructive test thereof.

By employing the present invention in an arbor press of the type herein disclosed, large quantities of primers, detonators and explosive charges of pressed granular material have been produced which possess far more uniform and predictable characteristics than were heretofore obtainable with the use of presses of the prior art.

It will also be understood that the improved uniformity of product so pressed may be also realized in the case of an arbor press in which the ram is advanced toward the work by means of a cam attached to a spindle and driven by a motor or belt and pulley drive.

While the invention has been described with reference to a particular example which gives satisfactory results, it will be apparent to those skilled in the art to which the invention pertains, after understanding the invention, that various changes and modifications may be made without departing from the spirit and scope of the invention, and it is intended, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. An arbor press of the type described, a pair of coaxial ram members supported one within the other for relative longitudinal motion, a plurality of friction reducing balls disposed between said pair of ram members, means including a spring for maintaining said friction reducing balls between said rams, means for driving the outer ram member under control of an operator, a rigid support secured to the upper end of said outer ram member and comprising a pair of spaced transverse bars, resilient means attached to said support and disposed between said bars for driving the inner ram member when the outer ram member is driven, said resilient means being yieldable in proportion to the force applied thereby, and means controlled by the yielding of said resilient means for indicating the degree of driving force applied, whereby the driving force may be limited at will by the operator when a predetermined force is exerted by the press.

2. In an arbor press of the character disclosed including a ram adapted to be advanced under control of an operator and having a channel longitudinally arranged therethrough, in combination, force transferring apparatus comprising a pair of spaced transverse members attached to said ram, a plunger slideably disposed both within and beyond said channel and having a head on one end thereof for engaging the work and hardened cap on the other end thereof disposed between said members, resilient means arranged between said members and abutting said cap for transferring to said plunger the force applied by the ram, a plurality of ball bearing means disposed between the ram and the plunger throughout substantially the full length thereof for minimizing friction between the ram and the plunger, means including a spring for maintaining the ball bearing means between the ram and plunger, and means controlled by the resilient means for indicating the force applied to said plunger whereby the operator is enabled to limit the force applied to the work in each successive advance of the ram when a predetermined maximum force has been applied thereto.

3. In an arbor press of the class disclosed having a power operated pinion arranged within the head of the press, a vertically disposed ram member arranged within said head and having a rack on one face thereof in meshing relation with said pinion, an additional ram member substantially coextensive with said ram and coaxial therewith and slideably arranged therein, a plurality of vertical channels in said additional ram member, a plurality of ball bearings disposed within said channels for supporting the additional ram member in spaced relation with respect to the ram member, bearing retaining means arranged at both ends of said channels and adapted to retain said ball bearings therein, force indicating means secured to one of the ram members and adapted to operate in response to relative motion between said ram and ram member, spring means for limiting the relative motion between said ram and ram member in proportion to the force exerted by the press on the work, and means including a pair of transverse members for supporting said spring means in operative relation with respect to the additional ram member.

4. In an arbor press for applying a predetermined degree of force to an object to be compressed and having indicating means for continuously indicating the degree of force applied, the combination of an outer ram member adapted to be operated by a rack and pinion and having a longitudinal cylindrical opening therethrough, a cylindrical member disposed within said cylindrical opening and having a plurality of longitudinal channels therein, a plurality of ball bearings arranged within said channels for accurately spacing said cylindrical member axially within the cylindrical opening, ball bearing retaining means at the lower end of said ram, a closely wound spring member surrounding said cylindrical member at the upper end thereof and having an internal diameter substantially equal to the diameter of said cylindrical opening whereby said ball bearings are retained therein, means responsive to relative axial motion between the ram and cylindrical member for transmitting force from the ram to the cylindrical member, and means controlled by said force transmitting means for indicating the degree of force exerted by the press.

5. In an arbor press for applying a predetermined degree of force to an object to be compressed and having indicating means for continuously indicating the degree of force applied, the combination of an outer ram member adapted to be operated by a rack and pinion and having a longitudinal cylindrical opening therethrough, a cylindrical member disposed within said cylindrical opening and having a plurality of longitudinal channels therein, a plurality of ball bearings arranged within said channels for spacing said cylindrical member axially within the cylindrical opening, ball bearing retaining means at the lower end of said ram, a closely wound spring member surrounding said cylindrical member at the upper end thereof and having an internal diameter substantially equal to the diameter of said cylindrical opening for maintaining the ball bearings within said channels, a support secured to the upper end of the ram member, means yieldably secured to said support and responsive to relative axial motion between the ram and cylindrical member for transmitting force from the ram to the cylindrical member, and means controlled by said force transmitting means for indicating the degree of force applied to said object by the press.

6. In an arbor press for applying a predetermined degree of force to an object to be compressed and having indicating means for continuously indicating the degree of force applied, the combination of an outer ram member constructed and arranged to be operated by a rack and pinion, said ram member having a longitudinal cylindrical opening extending therethrough, a cylindrical member disposed within said cylindrical opening and having a plurality of longitudinal channels therein, a plurality of ball bearings arranged within said channels for spacing said cylindrical member in axial coincidence with the cylindrical opening, means secured to the lower end of said ram for maintaining the ball bearings within the channels, a closely wound spring member surrounding said cylindrical member at the upper end thereof and having an internal diameter substantially equal to the diameter of said cylindrical opening for preventing displacement of the ball bearings at the upper end of the cylindrical member, a support secured to said upper end of the ram member and comprising a pair of spaced rigid transverse members, a flat spring yieldably disposed between said transverse members and constructed and arranged to be deflected in response to the pressure exerted thereon by movement of the cylindrical member relative to the ram member as the force is applied to said object, and means secured to said support and responsive to said deflection of the flat spring for indicating the force applied to the object by said press.

7. In an arbor press for applying a predetermined degree of force to an object to be compressed and having indicating means for continuously indicating the degree of force applied, the combination of an outer ram member constructed and arranged to be operated by a rack and pinion, said ram member having a longitudinal cylindrical opening extending therethrough, a cylindrical member disposed within said cylindrical opening, said cylindrical member having a plurality of longitudinal channels therein, a plurality of ball bearings arranged within said channels for spacing the cylindrical member in axial coincidence with the cylindrical opening, a plurality of pins secured to the lower end of said ram and respectively extending into the channels for maintaining the ball bearings therein, a closely wound spring member surrounding the cylindrical member at the upper end thereof for preventing displacement of the ball bearings at said upper end, a support comprising a pair of spaced rigid transverse members, one of which members is secured to the upper end of the ram member, a pair of spaced fulcrums secured to one of said transverse members, a flat spring disposed between said transverse members and yieldably secured to said fulcrums and constructed and arranged to be deflected in response to the pressure exerted thereon by movement of the ram member as the force is applied to said object, and means responsive to said deflection of the flat spring for indicating the degree of force exerted by said press.

8. In an arbor press of the character disclosed including a ram adapted to be advanced under control of an operator and having a channel longitudinally arranged therethrough, in combination, a supporting frame comprising a pair of spaced transverse members secured to the upper end of said ram, a plunger slideably disposed within said channel and having a head on one end thereof for engaging the work and a hardened cap on the other end thereof disposed between the transverse members, resilient means arranged between said members and yieldably secured thereto and abutting said cap for transferring to said plunger through the cap the force applied to the ram, a plurality of ball bearing means disposed between the ram and plunger throughout substantially the full length thereof for minimizing friction between the ram and the plunger, means including a plurality of pins for maintaining the ball bearing means between the ram and plunger, and means controlled by the resilient means for indicating the force applied to said plunger.

HARRY H. MOORE.
CARROLL L. JOHNSON.

REFERENCES CITED

The following references are of record in the file of this patent:

UNITED STATES PATENTS

| Number | Name | Date |
|---|---|---|
| 1,770,046 | Shore | July 8, 1930 |
| 1,878,335 | Fleischmann | Sept. 20, 1932 |
| 2,368,900 | Templin | Feb. 6, 1945 |
| 2,392,702 | Saunders | Jan. 8, 1946 |